United States Patent [19]
Wilson et al.

[11] Patent Number: 5,036,173
[45] Date of Patent: Jul. 30, 1991

[54] ELECTRICAL DISCHARGE APPARATUS WITH A DIELECTRIC FLUID ASSEMBLY

[75] Inventors: Geoffrey Wilson, Chesterfield; Gareth A. Evans, Sheffield, both of England

[73] Assignee: Sarclad International Limited, Chesterfield, England

[21] Appl. No.: 441,103

[22] Filed: Nov. 22, 1989

[30] Foreign Application Priority Data

Nov. 23, 1988 [GB] United Kingdom ............. 8827342

[51] Int. Cl.$^5$ .................. B23H 1/00; B23H 9/04
[52] U.S. Cl. ........................ 219/69.11; 219/69.14
[58] Field of Search ............ 219/69.11, 69.14, 69.15, 219/69.16; 204/129.1, 129.2, 129.25, 129.5, 129.7, 129.75, 224 M; 220/85 A, 85 B; 51/263, 264, 272

[56] References Cited

U.S. PATENT DOCUMENTS

| | | | |
|---|---|---|---|
| 3,148,488 | 9/1964 | Reaser | 51/272 |
| 3,223,610 | 12/1965 | Inoue | 204/224 M |
| 4,484,053 | 11/1984 | Michishita et al. | 219/69.15 |
| 4,543,460 | 9/1985 | Inoue | 219/69.15 |
| 4,634,825 | 1/1987 | Budin et al. | 219/69.14 |

FOREIGN PATENT DOCUMENTS

| | | |
|---|---|---|
| 2830791A | 1/1980 | Fed. Rep. of Germany. |
| 232004 | 1/1986 | Fed. Rep. of Germany ... 219/69.11 |
| 54-3282 | 1/1979 | Japan ............... 220/85 B |
| 512022 | 4/1976 | U.S.S.R. .............. 219/69.14 |
| 2024077A | 1/1980 | United Kingdom. |

Primary Examiner—Geoffrey S. Evans
Attorney, Agent, or Firm—Kinney & Lange

[57] ABSTRACT

Apparatus for use when machining or applying a textured finish to a surface of a workpiece comprises a receptacle for containing dielectric fluid which is closed on all sides excepting that side which, in use of the apparatus, engages the adjoining surface of the workpiece. The open side of the receptacle carries a flexible structure which can be moved towards and away from the workpiece surface between a first position in which the open side of the receptacle is spaced from the workpiece and a second position in which the workpiece surface closes off the open side of the receptacle. The flexible structure carries at its edge surface a resilient member whose contour can be varied to match the contour of the workpiece. In a preferred embodiment the flexible structure comprises a bellows-like structure.

10 Claims, 4 Drawing Sheets

ELECTRICAL DISCHARGE APPARATUS WITH A DIELECTRIC FLUID ASSEMBLY

FIELD OF THE INVENTION

This invention relates to apparatus for containing dielectric fluid when machining or applying a textured finish to a surface of a workpiece by an electrical discharge technique in which a series of electrical pulses from one or more electrodes is passed through a suitable dielectric fluid across a gap between an electrode and a workpiece surface. More especially, the invention concerns apparatus for containing a dielectric fluid when applying a textured or matt finish to the surface of a work-roll used in the rolling of metallic products such as steel sheet and strip to produce on the rolled products a complementary textured or matt finish.

DESCRIPTION OF THE PRIOR ART

It has been proposed previously to spray dielectric fluid onto a work roll surface immediately above the gap across which electrical pulses are passed or to submerge the lower portion of the roll partially within a bath of dielectric liquid. Spray techniques have been found to be unsatisfactory because of the likelihood of there being an inadequate supply of dielectric in the gap from time to time so leading to arcing. Both techniques are inefficient in their use of dielectric, the latter requiring a considerable quantity of dielectric to be present.

Our granted U.S. Pat. No. 4870243 and our co-pending U.S. patent application Ser. No. 07/200693 disclose electrical discharge apparatus in which the discharge electrodes are submerged in a bath of dielectric fluid contained within a relatively small gaiter, one side of which is closed by its abuttment with the workpiece surface. The roll contacting face of the gaiter is contoured to the particular profile of the workpiece (especially a work roll being textured) and is bounded by a flexible edge strip to provide a seal with the adjoining workpiece surface. The apparatus disclosed ensures a constant and adequate supply of dielectric to the gap whilst reducing significantly the amount of dielectric required.

One disadvantage of the apparatus described in our co-pending applications, however, is that, its use is essentially limited to one particular roll profile. Thus, where a series of rolls are to be textured, a similar number of gaiters or gaiter roll contacting end faces are required.

SUMMARY OF THE INVENTION

One object of the present invention is to provide dielectric containing apparatus whose workpiece engaging profile can be varied to match the external surface or profile of a range of workpieces, e.g. work rolls.

According to the present invention in one aspect, there is provided apparatus for use when machining or applying a textured finish to a surface of a workpiece, the apparatus comprising a receptacle which is closed on all sides excepting that which, in use, engages the adjoining surface of the workpiece, the open side of the receptacle carrying a flexible-structure which can be moved towards and away from the workpiece surface between positions in which the open side of the receptacle is spaced from the workpiece and in which the workpiece surface closes off the open-side of the receptacle, the flexible-structure carrying at its edge surface a resilient member whose contour can be varied to match the contour of the workpiece.

The flexible structure may comprise a bellows-like structure and the resilient member may comprise a seal of, for example, a rubber or plastics material such as neoprene.

According to the present invention in another aspect, there is provided a receptacle for containing dielectric fluid, the receptacle including at one end a flexible member movable towards and away from a surface of a workpiece, the flexible member cooperating with the workpiece surface to define one wall of the receptacle and including, at its workpiece engaging end, a member which, on being urged into contact with the workpiece surface, has sufficient resilience to cause it to conform to and complement the profile of the workpiece surface.

DESCRIPTION OF THE DRAWINGS

The invention will now be described by way of example only with reference to the accompanying diagrammatic drawings in which.

DESCRIPTION OF THE PREFERRED EMBODIMENTS OF THE INVENTION

Figure 1:
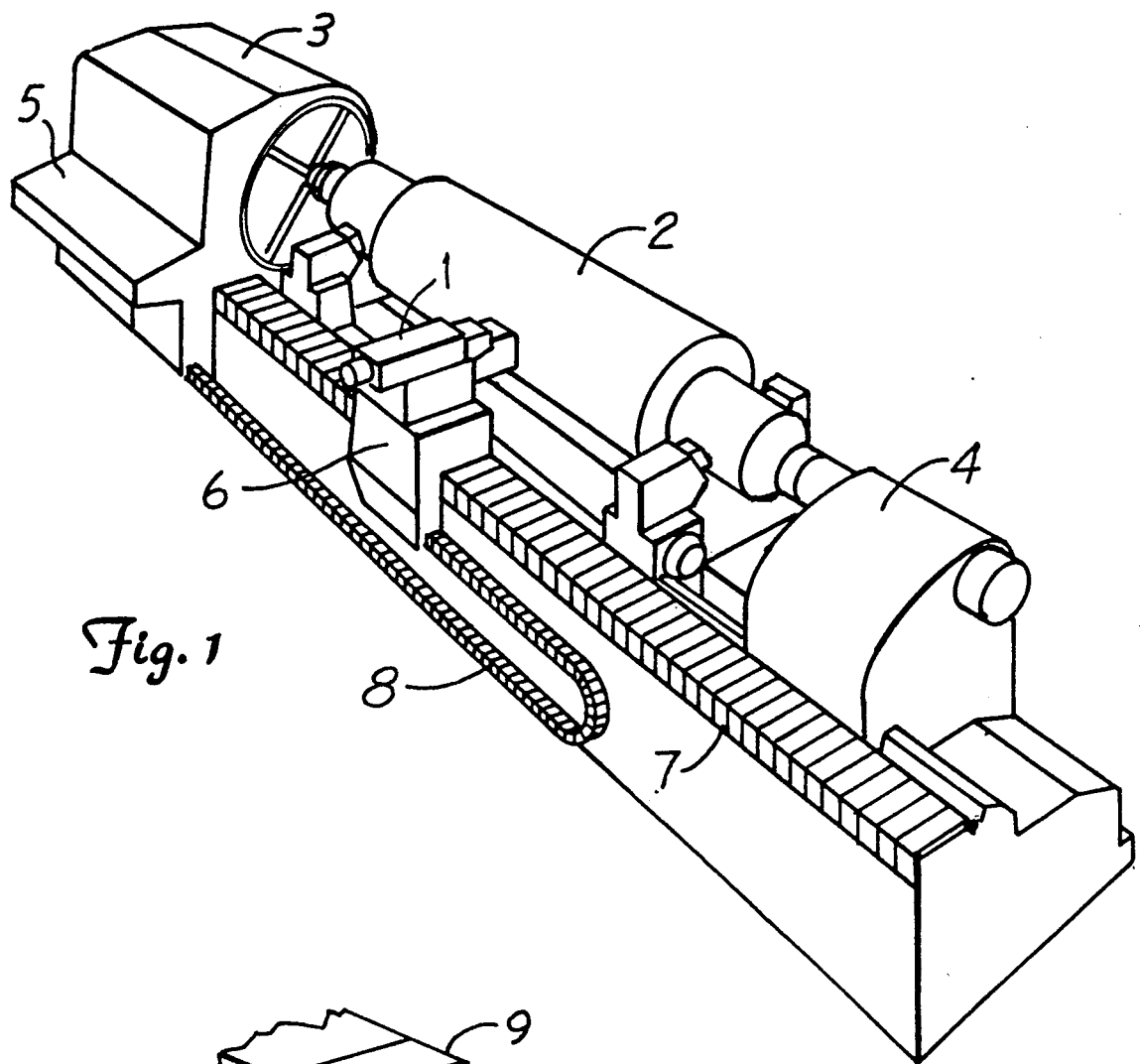
FIG. 1 is a perspective view which diagrammatically illustrates electrical discharge apparatus including dielectric containing receptacle in accordance with the invention mounted adjacent the work surface of a mill roll.

In FIG. 1 of the drawing, electrical discharge apparatus 1 is shown positioned adjacent the work surface of a mill roll 2. The mill roll 2 is mounted horizontally for rotation about its longitudinal axis between a headstock 3 driven by an electric motor (not shown) over a controlled range of speeds and an idler tailstock 4 of a lathe-type machine.

The electrical discharge apparatus 1 is mounted on a carriage 6 driven lengthwise of the mill roll 2 by a second electric motor (not shown) along a track 7 positioned to one side of the roll 2. The carriage is coupled to a control console 5 via a cable housed within an articulated conduit 8.

Figure 2:
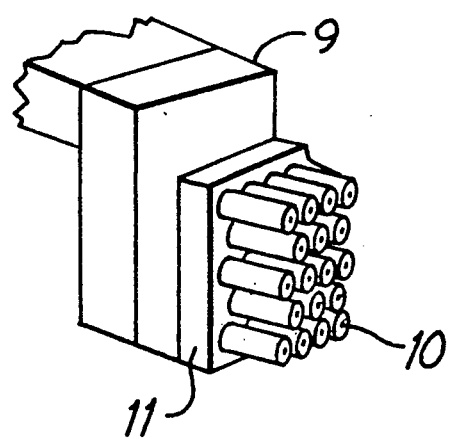
FIG. 2 is a side elevational perspective view to an enlarged scale of the electrode assembly of the electrical discharge apparatus illustrated in FIG. 1.
Figure 3:
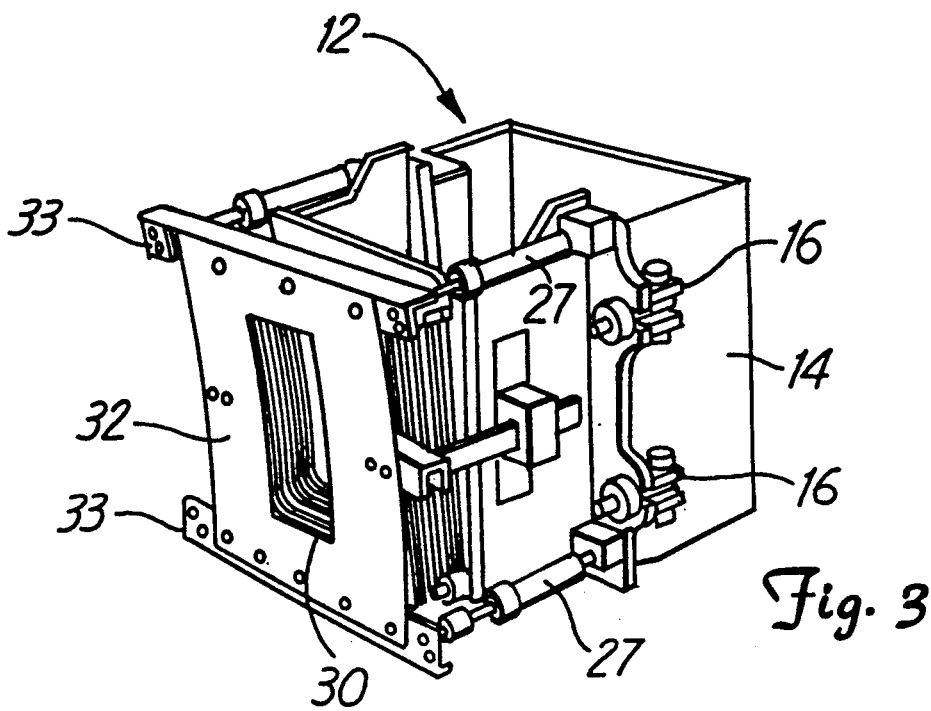
FIG. 3 is a schematic side elevational perspective view to an enlarged scale of the dielectric containing receptacle illustrated in FIG. 1 without the electrode assembly in place.
Figure 4:
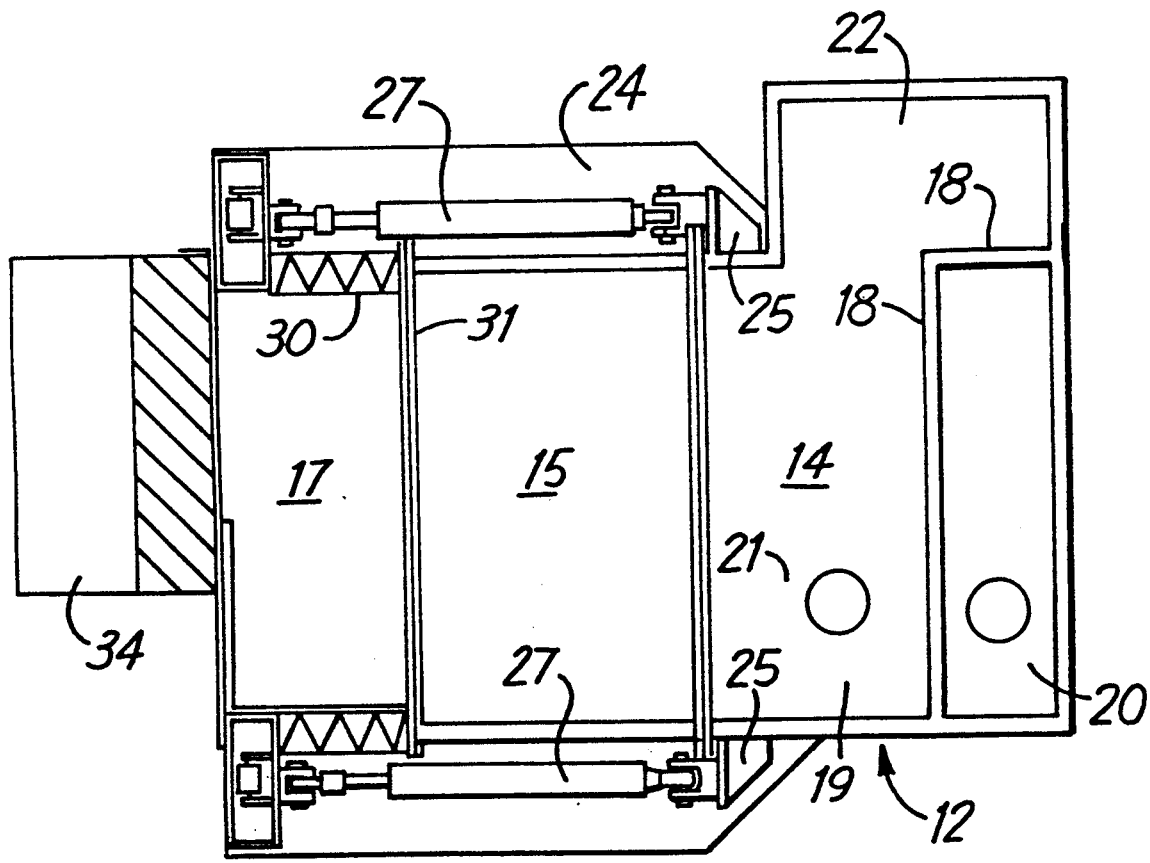
FIG. 4 is a plan view from above of the dielectric containing receptacle illustrated schematically in FIG. 3.

As will be seen more clearly from FIG. 2, the apparatus 1 includes a head 9 comprising an array of electrodes 10 supported from a block 11 of insulating material such that each individual electrode is insulated electrically from its neighbours. The head including the electrodes 10 is carried by a servo mechanism and depends into a bath of dielectric fluid contained within a receptacle to which dielectric fluid can continuously be supplied and from which used dielectric fluid can continuously be withdrawn to maintain a required level of fluid within the gaiter. The dielectric containing receptacle is illustrated in greater detail in FIGS. 3 to 6.

Operation of the electrical discharge apparatus and the method of controlling the electrical discharges between the apparatus and the roll surface are described in greater detail in our granted U.S. Pat. No. 4870243 and our co-pending U.S. patent application Ser. No. 07/200693.

Referring now to FIGS. 3 to 6, it will be seen that the dielectric containing receptacle 12 is generally open-topped and comprises a rear section 14 secured to a mounting plate of the electrical discharge apparatus, a centre section 15 releasably connected by swing bolts 16 (see FIG. 2) to the rear section 14, and a front section 17 whose leading edge, in use, abuts the adjoining surface of the roll 2.

The boundary wall of the rear section 14 of the receptacle 12 encloses two upstanding walls of a height less than that of the boundary wall and which together define a dam 18. The dam 18 effectively divides the rear section 14 into two reservoirs, dielectric fluid present in the forwardmost reservoir 19 flowing over the dam 18 to enter the rearmost reservoir 20.

An outlet orifice 21 is set in the floor of the reservoir 19 and a similar outlet orifice is set in the floor of the reservoir 20. Control valves are positioned within each of the two outlet orifices to enable the flow of dielectric fluid therethrough to be independently controlled. Thus by varying the relative settings of the valves, the respective levels of dielectric fluid in the reservoirs 19, 20 of the rear section 14 of the receptacle can be controlled.

The floors of the receptacle sections 14, 15 are inclined to encourage the flow of dielectric towards and into the orifice 21.

The reservoir 19 includes a side chamber 22 into which sensors are suspended which detect the temperature of dielectric fluid contained within that chamber and, therefore, the receptacle. The sensors may automatically shut-down the electrical discharge apparatus should the measured temperature of the dielectric exceed a predetermined level, e.g. 60° C.

One or more additional sensors may be positioned within the side chamber 22 to sense the level of dielectric present in the chamber and, consequently, in the receptacle 12. This or these sensors conveniently operate automatically to close down the electrical discharge apparatus should the level of dielectric fluid fall below a predetermined value, i.e. a level below which one or more electrodes would be exposed.

As mentioned previously and as illustrated in FIG. 2, the centre section 15 of the receptacle 12 is detachably mounted to the rear section 14 by the swing bolts 16. The boundary walls 24 of the centre section 15 carry upper and lower brackets 25, 26 to which one end of each of four gas springs 27 are pivotably connected. The gas springs 27 are arranged in two pairs, one such pair being connected to the upper brackets 25 and the other pair to the lower brackets 26. The function of these gas springs will be described in greater detail below.

Also mounted on the external surface of the boundary walls 24 of the centre section 15 are guides 28 through which arms 29 can slide.

Attached to the leading edge of the centre section 15 is a bellows 30 manufactured from a neoprene based rubber fabric with interlocking stitching to provide an effective fluid holding structure. The bellows forms one part of the front section 17 of the receptacle 12 and is securely attached to the front edge of the centre section 15 by a clamping plate 31, a seal being positioned between the adjoining surfaces of the clamping plate and the front edge of the centre section 15.

The front edge of the bellows 30 is bonded by an adhesive to a flexible steel shim 32 carried by upper and lower clamping brackets 33 to which the leading ends of the gas springs 27 are connected. The shim in turn carries a flexible seal 34, the seal being bonded to the bellows by, for example, a double-sided adhesive tape. The seal is preferably manufactured from a closed cell neoprene sponge material. Additional clamping plates 35 are secured to the sides of the shim 32, these clamping plates being in turn each secured to one end of the two slide arms 29 (one carried on each side wall of the receptacle 12).

In use of the apparatus described, the required amount of dielectric fluid is admitted to the receptacle and the electrical discharge apparatus is positioned opposite the surface to be textured with the electrode head 11 supported from the servo mechanism positioned generally centrally within the receptacle 12. The head depends into the receptacle 12 so that all electrodes are, in use, immersed within the dielectric fluid present in the receptacle. The servo system operates to move the electrode head (and therefore the electrodes 10) towards and away from the roll surface in the manner described in our co-pending U.S. patent application Ser. No. 07/200693.

The gas springs 27 are operated to drive the bellows 30 and the steel shim 32 towards the roll surface. Once the centre section of the shim makes contact with the roll surface, continued application of pressure by the gas springs causes the shim 32 to flex about its centre and take up the profile of the roll surface. The gas springs 27 are pre-loaded to ensure that the contact pressure between the shim and the roll surface lies within predetermined limits. As the shim 32 adopts the profile of the roll, so the slide arms 29 move within the guides 28 to ensure that the entire face of the neoprene rubber seal 34 makes sufficient contact with the roll surface to provide an effective seal to prevent or inhibit the flow of dielectric therebetween.

Figure 5:
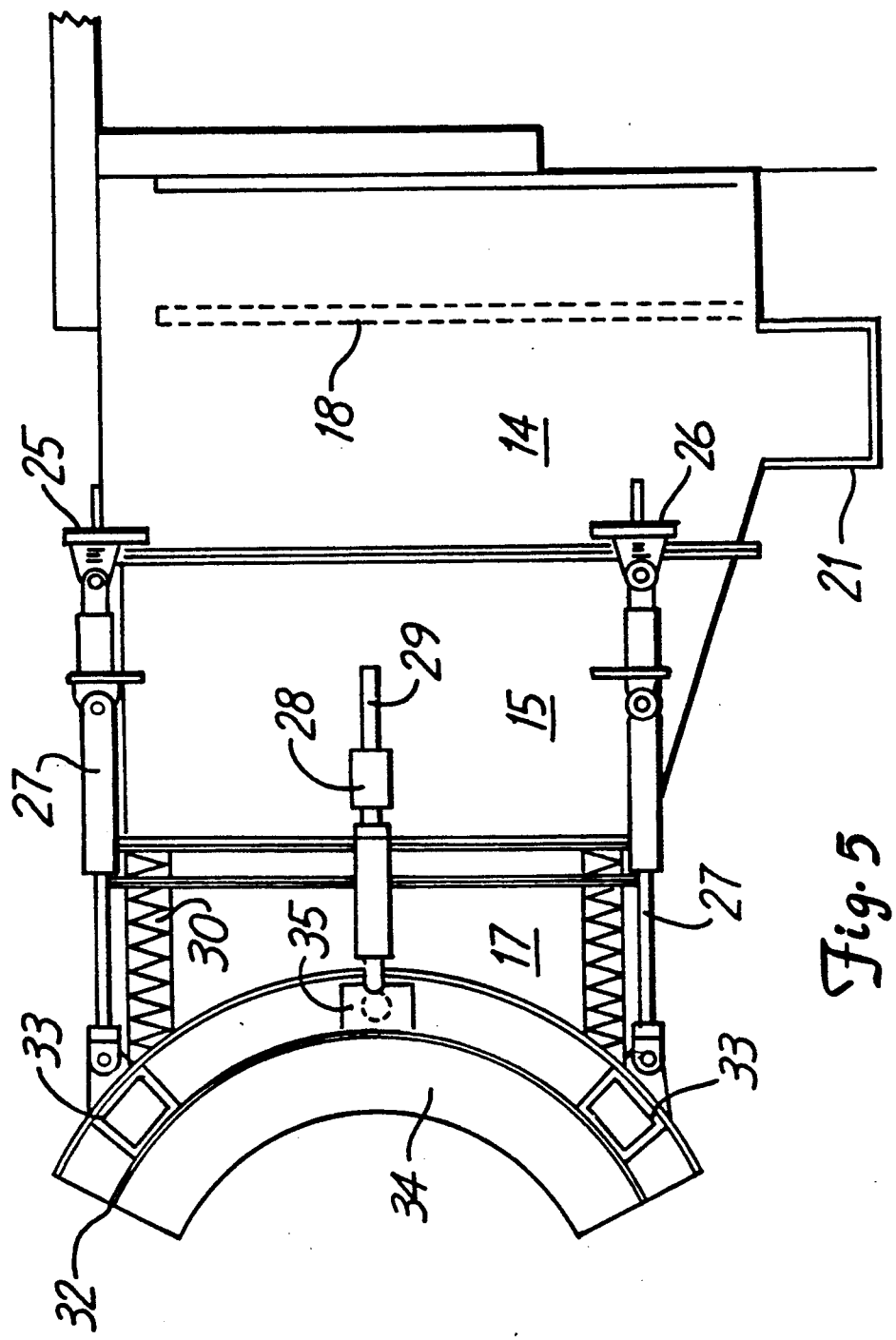
FIGS. 5 and 6 are side views of the dielectric containing receptacle illustrated in FIG. 4 shown in two different positions.
Figure 6:
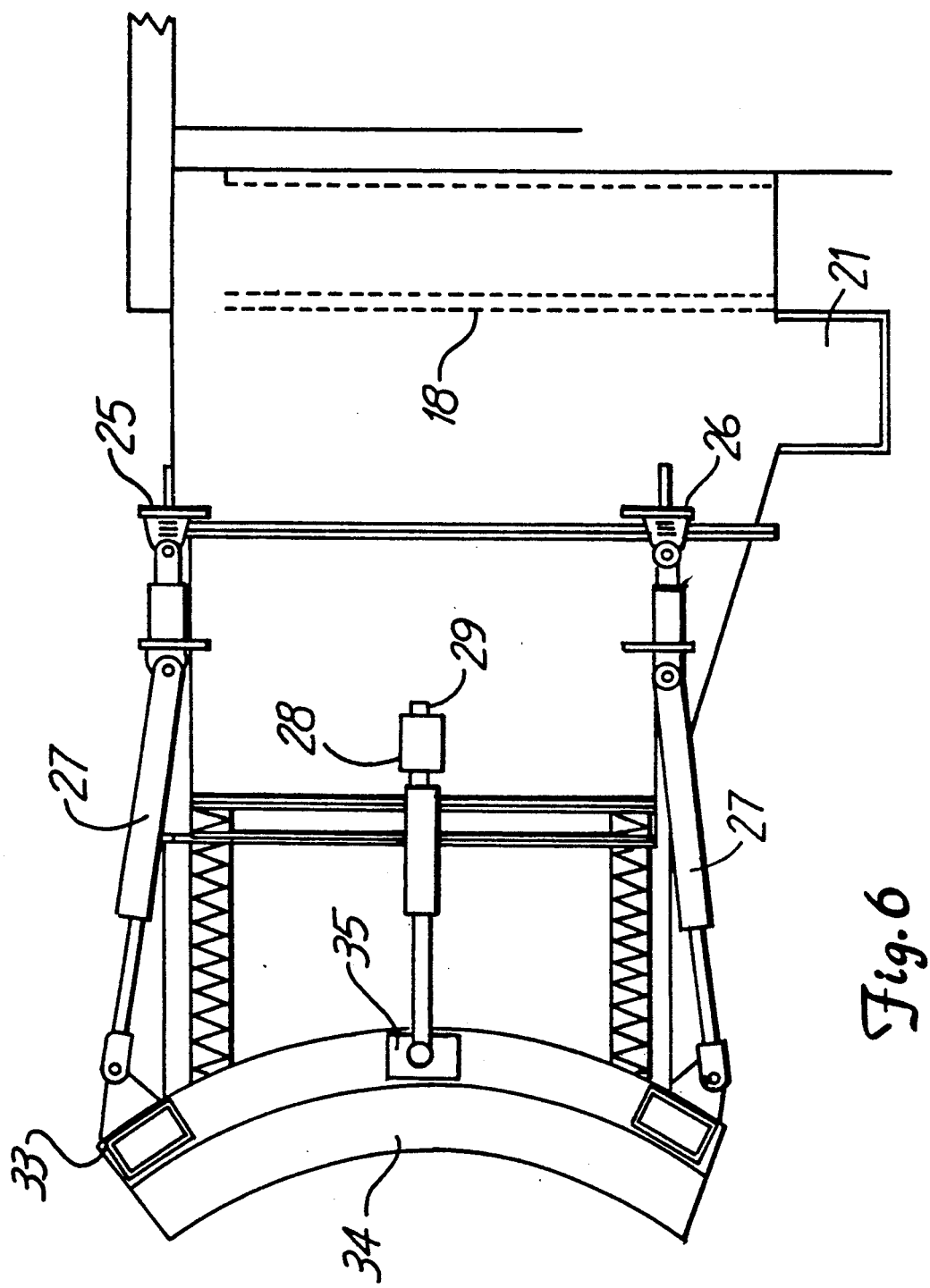

FIGS. 5 and 6 respectively show the bellows and associated structure in two different positions, one being more forwardly advanced than the other.

The guides and slide arms act to prevent stress or turning movement being applied to the bellows, particularly when the receptacle is being retracted away from the roll surface, or when the bellows is approaching the roll surface.

Dielectric fluid is continuously admitted to the receptacle 12 and recirculated via the dam 18 and the orifice 21.

It will be understood that the foregoing is merely exemplary of one embodiment of apparatus in accordance with the invention and that modifications can readily be made thereto without departing from the true scope of the invention.

We claim:

1. Electrical discharge apparatus for use when machining or applying a textured finish to a surface of a workpiece, the apparatus comprising a receptacle for containing dielectric fluid which is closed on all sides excepting that side which, in use of the apparatus, engages the adjoining surface of the workpiece, the open side of the receptacle carrying a flexible structure which can be moved towards and away from the workpiece surface between a first position in which the open side of the receptacle is spaced from the workpiece and a second position in which the workpiece surface closes off the open side of the receptacle, the flexible structure carrying at its edge surface a resilient member whose contour can be varied to match the contour of the workpiece.

2. Apparatus as claimed in claim 1 wherein the flexible structure comprises a bellows-like structure.

3. Apparatus as claimed in claim 1 wherein the receptacle is generally open-topped and comprises a rear section, a centre section releaseably connected to the rear section and a front section which comprises the flexible structure.

4. Apparatus as claimed in claim 3 wherein the boundary wall of the rear section of the receptacle encloses two upstanding walls of a height less than that the boundary wall and which together define a dam.

5. Apparatus as claimed in claim 4 wherein the dam effectively divides the rear section into two reservoirs, dielectric fluid which in use of the apparatus is present in the forwardmost reservoir flowing over the dam to enter the rearmost reservoir of the rear section.

6. Apparatus as claimed in claim 5 wherein outlet orifices are set in the floor of each reservoir and wherein control valves are positioned within each of the two outlet orifices to enable the flow of dielectric fluid therethrough to be independently controlled.

7. Apparatus as claimed in claim 1 wherein movement of the flexible structure towards and away from the workpiece surface is effected by a plurality of gas springs each connected at one end to fixed structure of the receptacle and at their other end to the flexible structure.

8. Apparatus as claimed in claim 2 wherein the bellows is manufactured from a neoprene-based rubber fabric with interlocking stitching to provide an effective fluid holding structure.

9. Apparatus as claimed in claim 8 wherein the front edge of the bellows is bonded by an adhesive to a flexible steel shim to which the leading ends of the gas springs are connected.

10. Electric discharge apparatus for use with electrically conductive workpieces, the apparatus comprising a plurality of electrodes each insulated electrically from the others and each carried by a head capable of being driven linearly of the workpiece with the electrodes spaced from the workpiece surface, a receptacle for dielectric fluid into one side of which the several electrodes protrude and another open side of which is closed by a surface of the workpiece against which, in use, the receptacle abuts, means for conveying dielectric fluid to and from the receptacle and for maintaining a predetermined level therein, and means for promoting a series of discrete electrical discharges through the dielectric fluid and between each electrode and the adjacent surface of the workpiece; the open side of the receptacle carrying a flexible structure which can be moved towards and away from the workpiece surface between a first position in which the open side of the receptacle is spaced from the workpiece and a second position in which the workpiece surface closes off the open side of the receptacle, the flexible structure carrying at its edge surface a resilient member whose contour can be varied to match the contour of the workpiece.

* * * * *

UNITED STATES PATENT AND TRADEMARK OFFICE
CERTIFICATE OF CORRECTION

PATENT NO. : 5,036,173

DATED : July 30, 1991

INVENTOR(S) : Geoffrey Wilson et al.

It is certified that error appears in the above-identified patent and that said Letters Patent is hereby corrected as shown below:

On the Title page, Item [56]

In the References Cited Section, under U.S. PATENT DOCUMENTS, insert the following:

4,870,243   9/1989   Wilson et al. .  219/69.14

Signed and Sealed this

Twenty-ninth Day of December, 1992

*Attest:*

DOUGLAS B. COMER

*Attesting Officer*     *Acting Commissioner of Patents and Trademarks*